United States Patent
Hellin

(10) Patent No.: US 10,851,822 B2
(45) Date of Patent: Dec. 1, 2020

(54) CONNECTING DEVICE FOR IMPROVED ALIGNMENT

(71) Applicant: BARCO NV, Kortrijk (BE)

(72) Inventor: Frank Hellin, Heule (BE)

(73) Assignee: BARCO NV, Kortrijk (BE)

(*) Notice: Subject to any disclaimer, the term of this patent is extended or adjusted under 35 U.S.C. 154(b) by 0 days.

(21) Appl. No.: 15/544,608

(22) PCT Filed: Jan. 23, 2015

(86) PCT No.: PCT/EP2015/051408
§ 371 (c)(1),
(2) Date: Jul. 19, 2017

(87) PCT Pub. No.: WO2016/116170
PCT Pub. Date: Jul. 28, 2016

(65) Prior Publication Data
US 2017/0370390 A1    Dec. 28, 2017

(51) Int. Cl.
*F16B 21/00*    (2006.01)
*F16B 11/00*    (2006.01)
*F16B 21/20*    (2006.01)

(52) U.S. Cl.
CPC .......... *F16B 11/006* (2013.01); *F16B 21/20* (2013.01)

(58) Field of Classification Search
CPC ...... F16B 21/065; F16B 21/07; F16B 21/183; F16B 21/20; F16B 9/023; F16B 11/006; F16B 37/041
See application file for complete search history.

(56) References Cited

U.S. PATENT DOCUMENTS 2,236,850 A * 4/1941 Hansman .............. F16B 37/041
411/174
2,363,210 A * 11/1944 Tinnerman ............ F16B 37/041
411/175
(Continued)

FOREIGN PATENT DOCUMENTS

CH          704129 A2    5/2012
CN       101109404 A    1/2008
(Continued)

OTHER PUBLICATIONS

International Search Report (ISR) dated Sep. 23, 2015, for PCT/EP2015/051408.
(Continued)

*Primary Examiner* — Matthew R McMahon
(74) *Attorney, Agent, or Firm* — Bacon & Thomas, PLLC

(57) ABSTRACT

A device, system and method to connect a receiving member and a connecting device with a pin such that an asymmetrical configuration after the alignment of the connecting member and the receiving member does not give rise to asymmetrical glue distribution, nor asymmetrical shrinking nor curing drift. The receiving member has a receiving planar surface with at least one opening, and the connecting device has a main body with a contact plane, the main body having at least one opening where the connecting device is placed with the contact plane towards the receiving planar surface so that the at least one opening of the connecting device overlaps the at least one opening of the receiving surface, and the pin is inserted into the overlap. The system having a device for exerting a force between the contact plane of the connecting device and the receiving planar surface of the receiving member.

20 Claims, 14 Drawing Sheets

(56) References Cited

U.S. PATENT DOCUMENTS

| | | | | |
|---|---|---|---|---|
| 2,378,258 A * | 6/1945 | Tinnerman | F16B 37/041 | 411/174 |
| 2,378,684 A * | 6/1945 | Carlstrom | F16B 37/02 | 411/523 |
| 2,400,270 A * | 5/1946 | Tinnerman | F16B 5/0208 | 411/103 |
| 2,558,720 A * | 7/1951 | Hansman | F16B 37/041 | 411/175 |
| 2,822,198 A * | 2/1958 | Priestman | F16B 2/248 | 24/458 |
| 3,007,725 A * | 11/1961 | Becker | F16B 9/023 | 248/73 |
| 3,217,773 A * | 11/1965 | Munse | F16B 37/02 | 411/175 |
| 3,669,170 A * | 6/1972 | Schuster | F16B 37/041 | 411/175 |
| 3,680,900 A * | 8/1972 | Kawakami | F16B 9/00 | 403/274 |
| 3,927,707 A * | 12/1975 | Wright | F16B 37/041 | 411/174 |
| 4,050,831 A * | 9/1977 | DuBois | F02M 19/12 | 403/119 |
| 4,402,640 A * | 9/1983 | Peterson | F16B 37/04 | 264/249 |
| 4,714,392 A * | 12/1987 | Muller | F16B 37/041 | 411/175 |
| 4,793,753 A * | 12/1988 | Muller | B25B 23/08 | 24/455 |
| 4,836,007 A * | 6/1989 | Saccoccio | A44C 7/008 | 470/18 |
| 4,883,397 A * | 11/1989 | Dubost | F16B 5/0635 | 411/174 |
| 4,955,772 A * | 9/1990 | Reck | F16B 37/041 | 411/175 |
| 5,026,235 A * | 6/1991 | Muller | B25B 31/00 | 411/175 |
| 5,294,224 A * | 3/1994 | Kent | F16B 37/041 | 411/174 |
| 5,306,091 A * | 4/1994 | Zaydel | F16B 37/041 | 411/112 |
| 5,423,646 A * | 6/1995 | Gagnon | F16B 37/041 | 411/174 |
| 5,458,365 A * | 10/1995 | Rogers | B60R 21/215 | 280/728.3 |
| 5,588,666 A * | 12/1996 | Numata | B60R 21/2035 | 280/728.2 |
| 5,593,178 A * | 1/1997 | Shiga | B60Q 5/003 | 200/61.55 |
| 5,603,524 A * | 2/1997 | Barnes | B60R 21/215 | 280/728.2 |
| 5,653,147 A * | 8/1997 | Kelley | F16C 1/103 | 248/56 |
| 5,700,103 A * | 12/1997 | Tsai | F16B 37/005 | 403/260 |
| 5,713,707 A * | 2/1998 | Gagnon | F16B 37/041 | 411/112 |
| 5,755,458 A * | 5/1998 | Donovan | B60R 21/2035 | 280/728.1 |
| 5,961,264 A * | 10/1999 | Postadan | F16B 37/041 | 411/174 |
| 6,234,706 B1 * | 5/2001 | Hodzic | F16B 21/16 | 403/252 |
| 6,476,986 B2 | 11/2002 | Smith et al. | | |
| 6,842,949 B2 * | 1/2005 | Warren | F16G 11/06 | 24/115 H |
| 7,654,783 B2 * | 2/2010 | Giraud | F16B 37/041 | 411/174 |
| 7,704,008 B2 * | 4/2010 | Shinozaki | F16B 21/186 | 24/567 |
| 7,896,596 B2 * | 3/2011 | Rausch | F16B 37/041 | 411/174 |
| 8,186,883 B2 * | 5/2012 | Nollenberger | F16C 35/00 | 384/297 |
| 8,272,803 B2 * | 9/2012 | Lally | B65G 39/04 | 403/316 |
| 8,602,445 B2 * | 12/2013 | Williams | B60R 21/20 | 248/503 |
| 9,346,593 B2 * | 5/2016 | Dang | B65D 50/00 | |
| 9,490,743 B2 * | 11/2016 | Reynolds | H02S 40/34 | |
| 9,638,232 B2 * | 5/2017 | Takita | F16B 21/065 | |
| 10,156,183 B2 * | 12/2018 | Krajenke | F01D 25/04 | |
| 2002/0034023 A1 | 3/2002 | Smith et al. | | |
| 2007/0243038 A1 | 10/2007 | Rausch et al. | | |

FOREIGN PATENT DOCUMENTS

| | | |
|---|---|---|
| CN | 102493986 A | 6/2012 |
| CN | 204739068 U | 11/2015 |
| DE | 10 2012 205837 A1 | 10/2013 |
| FR | 2010335 A6 | 2/1970 |
| GB | 861050 A | 2/1961 |
| GB | 1216284 A | 12/1970 |

OTHER PUBLICATIONS

Written Opinion dated Sep. 23, 2015, for PCT/EP2015/051408.
Second Written Opinion dated Jan. 3, 2017, for PCT/EP2015/051408.
International Preliminary Report on Patentability dated Apr. 13, 2017, for PCT/EP2015/051408.
Chinese Office Action in related Chinese Application No. 201580074241.3, dated Jan. 31, 2019.
Chinese Office Action in corresponding Chinese Application No. 201580074241.3, dated Sep. 25, 2019.
Chinese Office Action in corresponding Chinese Application No. 201580074241.3, dated Mar. 16, 2020.

* cited by examiner

Figure 1 (prior-art)
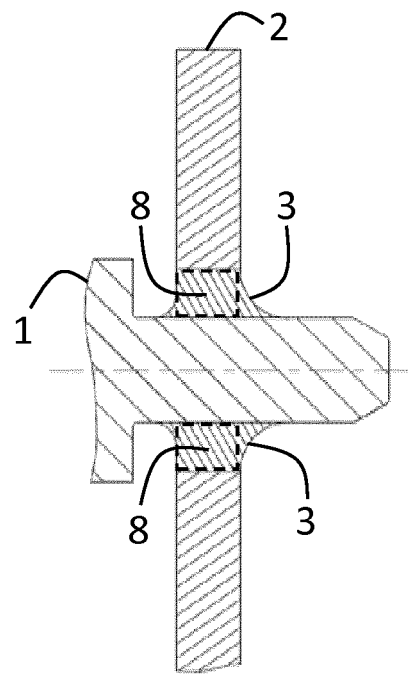
Figure 2 (prior-art)
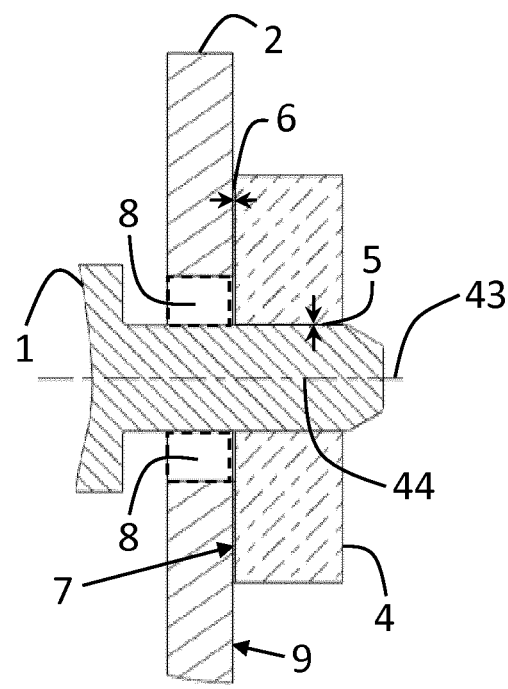
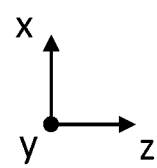

Figure 3 (prior-art)
Figure 4 (prior-art)
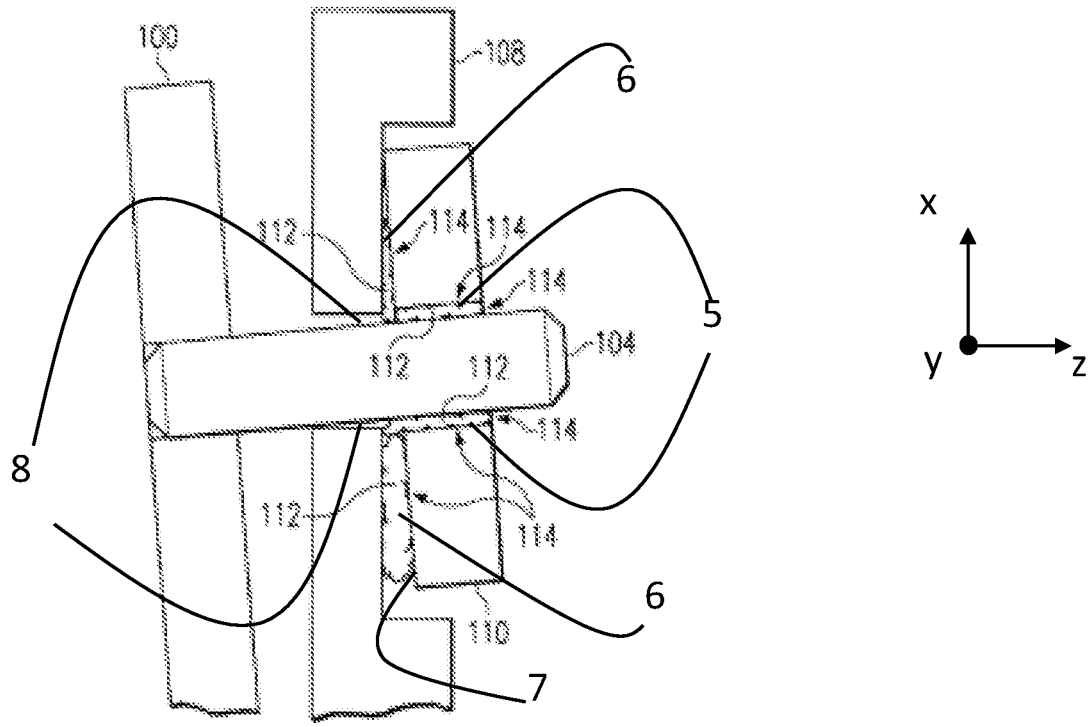

Figure 5
a)
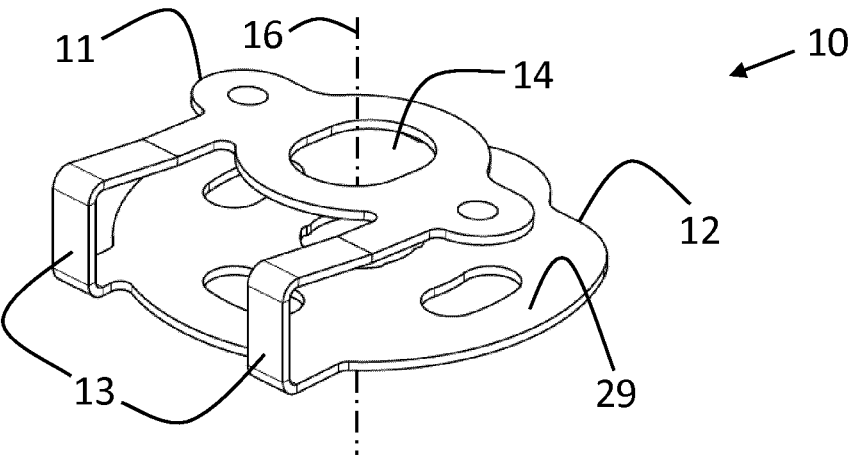
b)
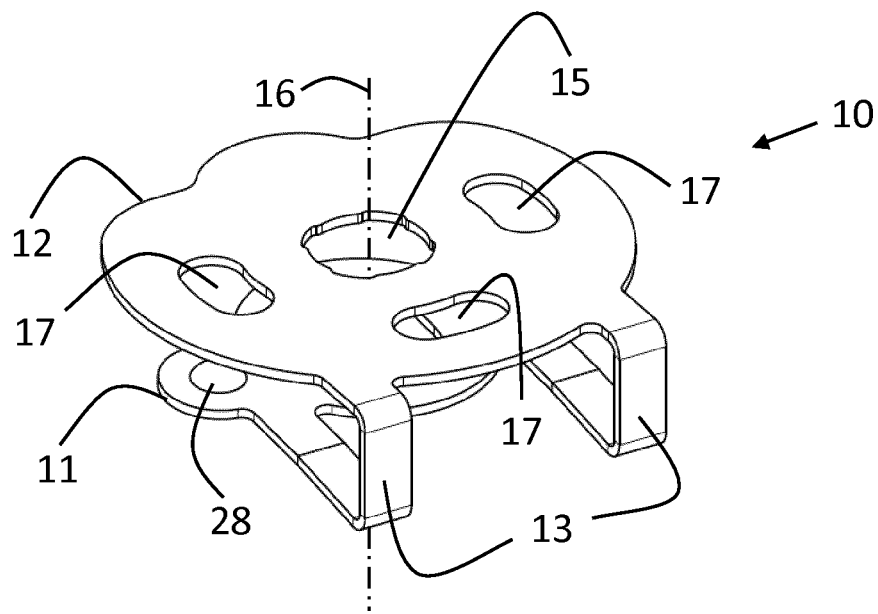
c)
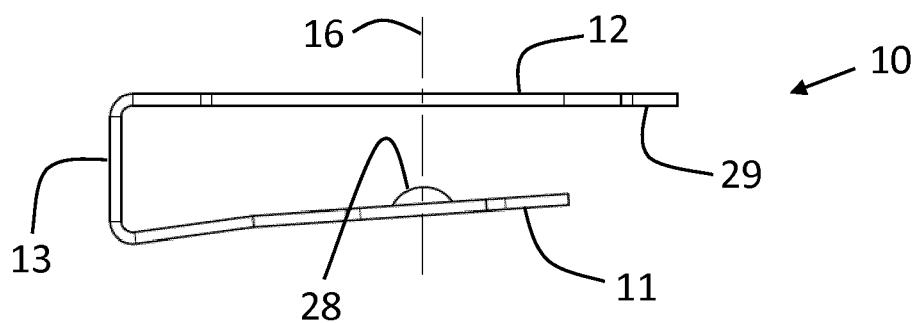

Figure 8a)(PRIOR ART)
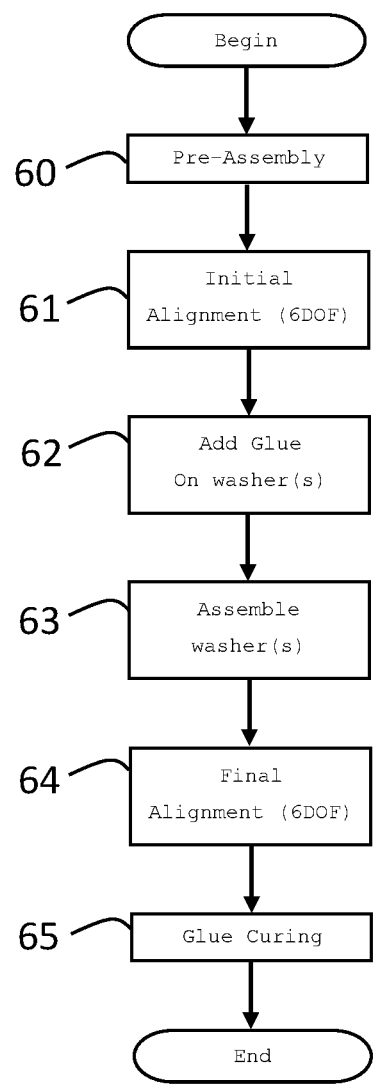

Figure 13
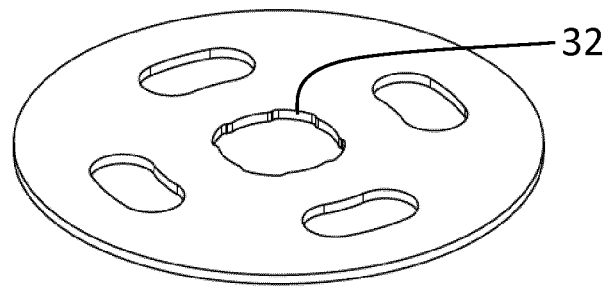
Figure 14
a)
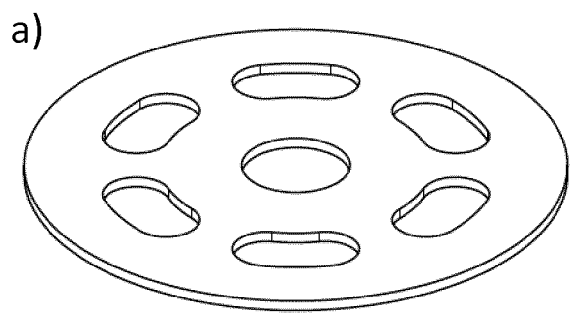
b)
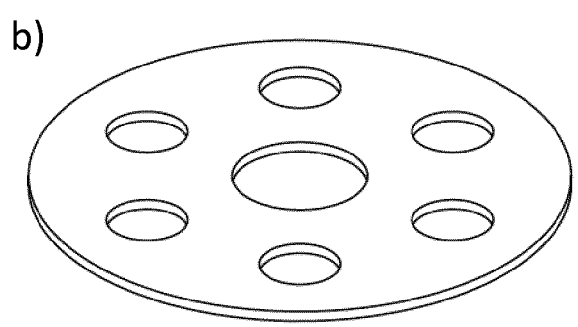
c)
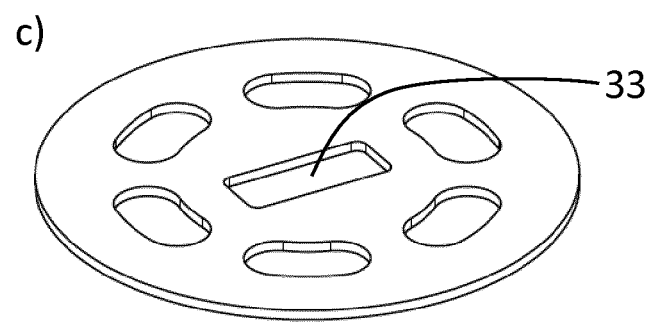

Figure 15
a)
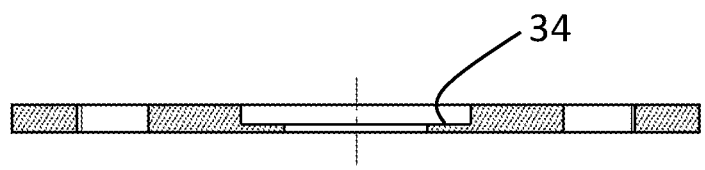
b)
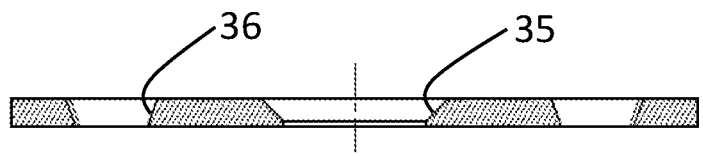
c)
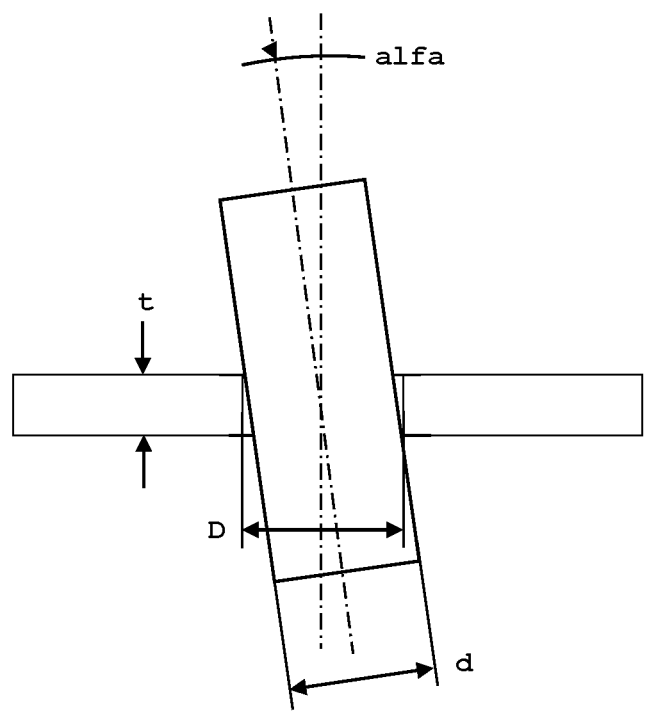

Figure 18
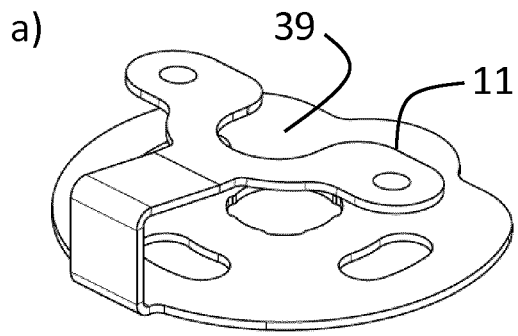
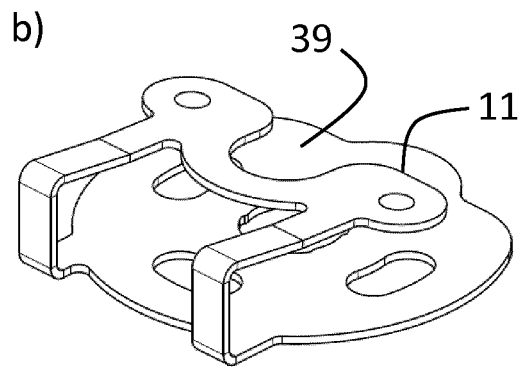
Figure 19
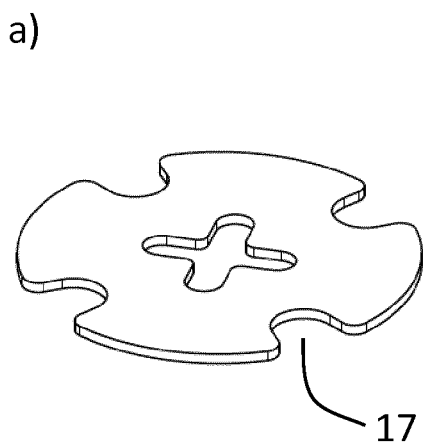
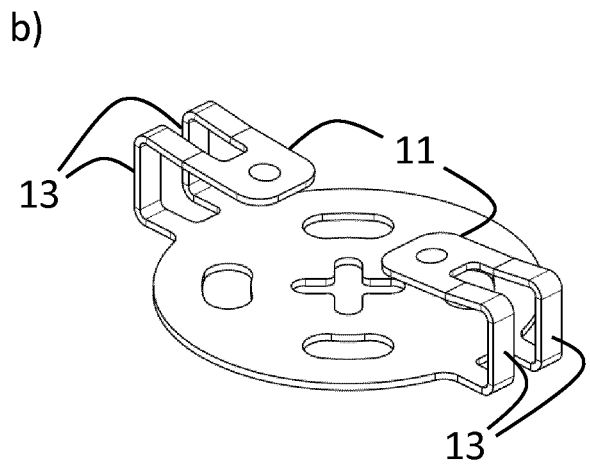

Figure 20
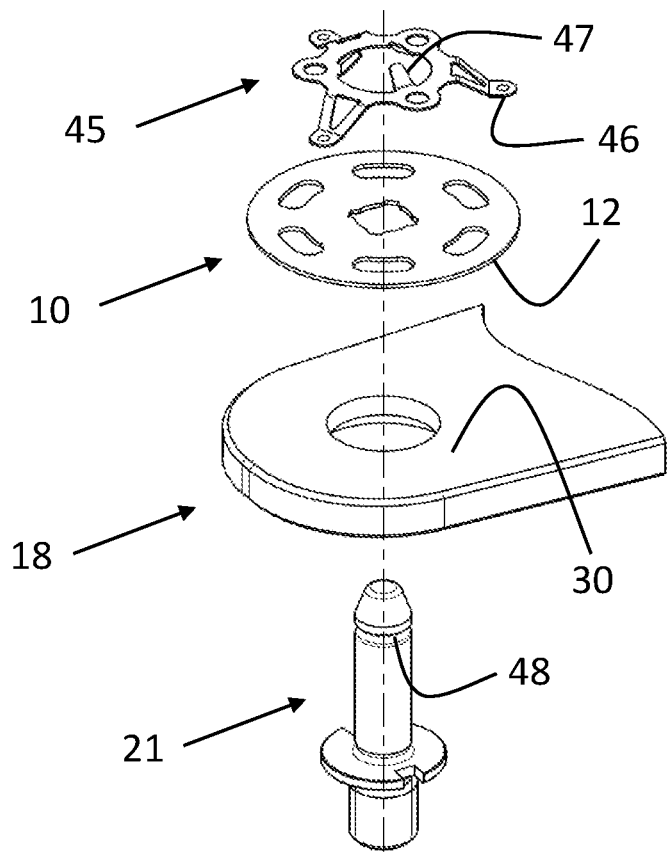
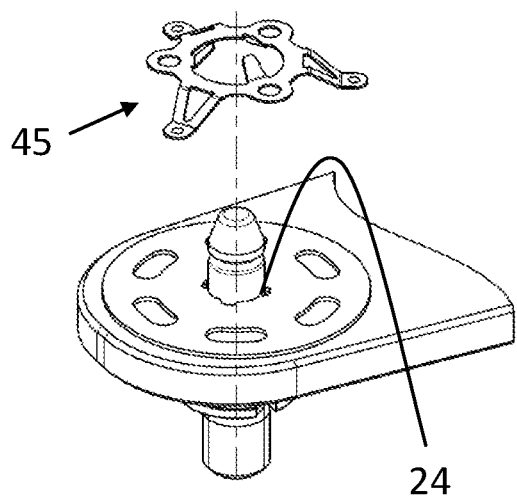
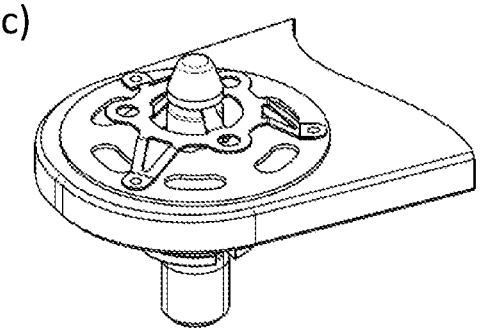

CONNECTING DEVICE FOR IMPROVED ALIGNMENT

The present invention relates to a connecting device for connecting and aligning two parts and a method of connecting a pin and a member comprising a pin, a member having a receiving planar surface with at least one opening, a connecting device having a main body with a contact plane. Such connecting devices can be used in optical devices.

BACKGROUND OF THE INVENTION

When assembling one or more imaging devices onto an "optical engine", it can be necessary to align up to six degrees of freedom (6DOF) per imaging device. After alignment, the imaging devices need to be fixed to the optical engine's structure. This can be obtained by a "pin through hole" construction comprising a protruding element and an opening in a receiving structure. The opening can be for example circular, rectangular or any shape suitable for the application. The protruding element, for example a round or flat pin, has some play in the opening to allow freedom of movement for the alignment process. After alignment, the gap between "pin and hole" can be filled with e.g. UV-curable glue and cured in order to fix the components of the system in the aligned position.

Glue typically shows some percentage of shrink during curing (linear shrinkage or volume shrinkage), which often causes an unwanted image device movement during curing or after removal of the alignment equipment once the glue is fully cured. This event is hereafter referred to as "curing drift". This curing drift can cause up to several pixels of image misalignment or so-called convergence error. Also the focus and so-called Scheimpflug alignment can, depending on the actual construction layout, be negatively influenced by the curing drift.

A way to decrease curing drift is to use special "low shrink" glue that has a very low "linear shrinkage during curing". However, some "low shrink" glues might turn out to be unsuitable for the application due to for example the system construction or the manufacturing process.

Also, some "low shrink" glues might perform poor on certain other important glue properties, such as for example overall strength, water absorption rate, glass transition temperature, outgassing, coefficient of thermal expansion, etc. In these cases it might be necessary to use glue that exhibits a higher amount of curing shrinkage.

It is further known from prior-art to keep the glue layer thickness as small as possible to limit these curing related drift effects. However, typically a minimum size of air gap has to be provided to allow for component manufacturing tolerances and sufficient freedom of movement when performing the precision alignment.

Pixel sizes of projection light valve devices or other electro-optical devices are continuously getting smaller, in 5-10 years a pixel pitch/size of 2.7 µm could be expected. For certain optical systems or applications, the currently achieved alignment accuracy will no longer be sufficient. With smaller pixel sizes the curing drift will have an increased impact on the image quality.

SUMMARY OF THE INVENTION

It is an object of the present invention to provide an alternative device, system and method to connect two members. An advantage of embodiments of the present invention is that the connection can have a high accuracy. For example, embodiments of the present invention can avoid one or more of the above mentioned deficiencies. For example, an asymmetrical configuration after the alignment of the connector and the receiving member in a prior-art system would give rise to asymmetrical glue distribution. This would in turn result in asymmetrical shrinking and curing drift. Embodiments of the present invention avoid this problem since the glue (or adhesive or potting compound) distribution is practically independent of an asymmetrical alignment.

The present invention is not limited to an optical system but could be applied to any system that needs precision alignment.

According to an aspect of the present invention there is provided a system for connecting a pin and a member comprising a pin, the system comprising a receiving member having a receiving planar surface with at least one opening, a connecting device having a main body with a contact plane, said main body having at least one opening whereby the connecting device is placed with the contact plane towards the receiving planar surface so that the at least one opening of the connecting device overlaps the at least one opening of the receiving surface, and the pin is inserted into said overlap, said system further comprising means for exerting a force between the contact plane of the connecting device and the receiving planar surface of the receiving member. The orientation of the pin with respect to the receiving planar surface of the receiving member can vary with six degrees of freedom, and for all orientations, the contact plane of the connecting device and the receiving planar surface of the receiving member remain parallel to each other.

The pin and the receiving member can take up positions so that they orient towards each other with six degrees of freedom wherein the positions are limited by the overlap opening and for each position, the contact plane of the connecting device and the receiving planar surface of the receiving member remain parallel to each other.

The contact plane can comprise at least three contact points which provide stability.

Preferably, for all orientations, the contact plane of the connecting device and the receiving planar surface of the receiving member stay in contact with each other. This makes the connection stable and the connecting device takes the correct position.

At least one opening need not be fully enclosed which makes the alignment and/or assembly simpler.

The means for exerting a force between the contact plane of the connecting device and the receiving planar surface of the receiving member is of mechanical-, magnetic-, gravitational-, electromagnetic-, electrostatic-, adhesive or of pressure differential nature, or any combination of any number of the seven. This allows a wide variety of force exerting means to be selected.

Alternatively or additionally the means for exerting a force between the contact plane of the connecting device and the receiving planar surface of the receiving member, can be provided externally, for example by an alignment machine. This allows a machine to be used that exerts a larger force and can be removed.

Alternatively or additionally the means for exerting a force between the contact plane of the connecting device and the receiving planar surface of the receiving member can be attached to the pin or to the connecting device. This allows flexibility in design.

Alternatively or additionally the means for exerting a force between the contact plane and the receiving planar surface of the receiving member can comprise an elastic member that is integrated with the connecting device or is attached to the receiving member so that it clamps the connecting device to the receiving member.

Alternatively or additionally the means for exerting a force between the contact plane and the receiving planar surface of the receiving member can comprise at least one second surface, distant from the contact plane, and at least one elastic member connecting the at least one second surface with the contact plane.

The second surface can have spherical or cylindrical elevations that make contact with the receiving member. This can allow an easier sliding of the one member over the other.

At least one opening of the main body of the connecting device can be of arbitrary shape, for example circular, oval, square, rectangular or triangular or any combination of any of the five. This allows flexibility in design.

The walls of at least one opening of the main body of the connecting device can have notches which can improve penetration by a fixing compound.

The height of the sidewalls of any of the openings of the main body of the connecting device can be smaller than the thickness of the rest of the connecting device.

The connecting device can be made out of metal, polymers or ceramics, or any combination of the three. This allows a selection of a material suitable for a specific application.

The connecting device can have members that are inclined towards each other in their resting state. This provides a spring action when the members are separated to slide over the receiving member.

In another aspect the present invention provides a method for connecting a pin and a member comprising a pin, a receiving member having a receiving planar surface with at least one opening, a connecting device having a main body with a contact plane, said main body having at least one opening, the method comprising: placing the connecting device with the contact plane towards the receiving planar surface so that an opening of the connecting device overlaps an opening of the receiving surface, and inserting the pin into said overlap, exerting a force between the contact plane of the connecting device and the receiving planar surface, wherein the orientation of the pin towards the receiving planar surface can vary with six degrees of freedom, and for all orientations, the contact plane of the connecting device and the receiving planar surface of the receiving member remain parallel to each other.

In accordance with another aspect a method is provided for joining a system comprising a pin, a receiving member and an auxiliary device, comprising the steps of
  Preparing the system, without glue applied,
  Aligning the system,
  Adding glue to the system, and
  Post-treating the system.

An independent aspect is a system for connecting a pin and a member comprising a pin, the system comprising a receiving member having a receiving planar surface with at least one opening, a connecting device having a main body with a contact plane, said main body having at least one opening whereby the connecting device is placed with the contact plane towards the receiving planar surface so that the at least one opening of the connecting device overlaps the at least one opening of the receiving surface, and the pin is inserted into said overlap, wherein the system has at least one drafted opening.

A further independent invention aspect is a method for connecting a pin and a member comprising a pin, and a receiving member having a receiving planar surface with at least one opening, a connecting device having a main body with a contact plane, said main body having at least one opening, the method comprising placing the connecting device with the contact plane towards the receiving planar surface so that the at least one opening of the connecting device overlaps the at least one opening of the receiving surface, and inserting the pin into said overlap, wherein at least one opening is a drafted opening.

BRIEF DESCRIPTION OF THE DRAWINGS

FIG. 1 shows a cross-section of a "pin through hole" system (prior-art).

FIG. 2 shows a cross-section of a "pin through hole" system with additional washer assembled (prior-art).

FIG. 3 shows a figure from U.S. Pat. No. 6,476,986-B2 (prior-art).

FIG. 4 shows a cross-section of a "pin through hole" system with additional washer prior to assembly (prior-art).

FIG. 5a-c) shows a connecting device with integrated spring function according to an embodiment of the present invention.

FIG. 8a) shows a flow chart according to the method described in U.S. Pat. No. 6,476,986-B2 (prior-art).

FIG. 13 shows an example of a connecting device according to an embodiment of the present invention.

FIG. 14 shows examples of connecting devices with different shapes of the holes according to an embodiment of the present invention.

FIG. 15 shows cross-sections of examples of connecting devices where the hole edges have been locally thinned out according to an embodiment of the present invention.

FIG. 18 shows examples of connecting devices with an open hole according to an embodiment of the present invention.

FIG. 19 shows examples of connecting devices according to an embodiment of the present invention.

FIG. 20 shows further embodiments of the present invention wherein a "spring function" provided with, e.g. is connected to the pin.

DEFINITIONS

Figure 6:
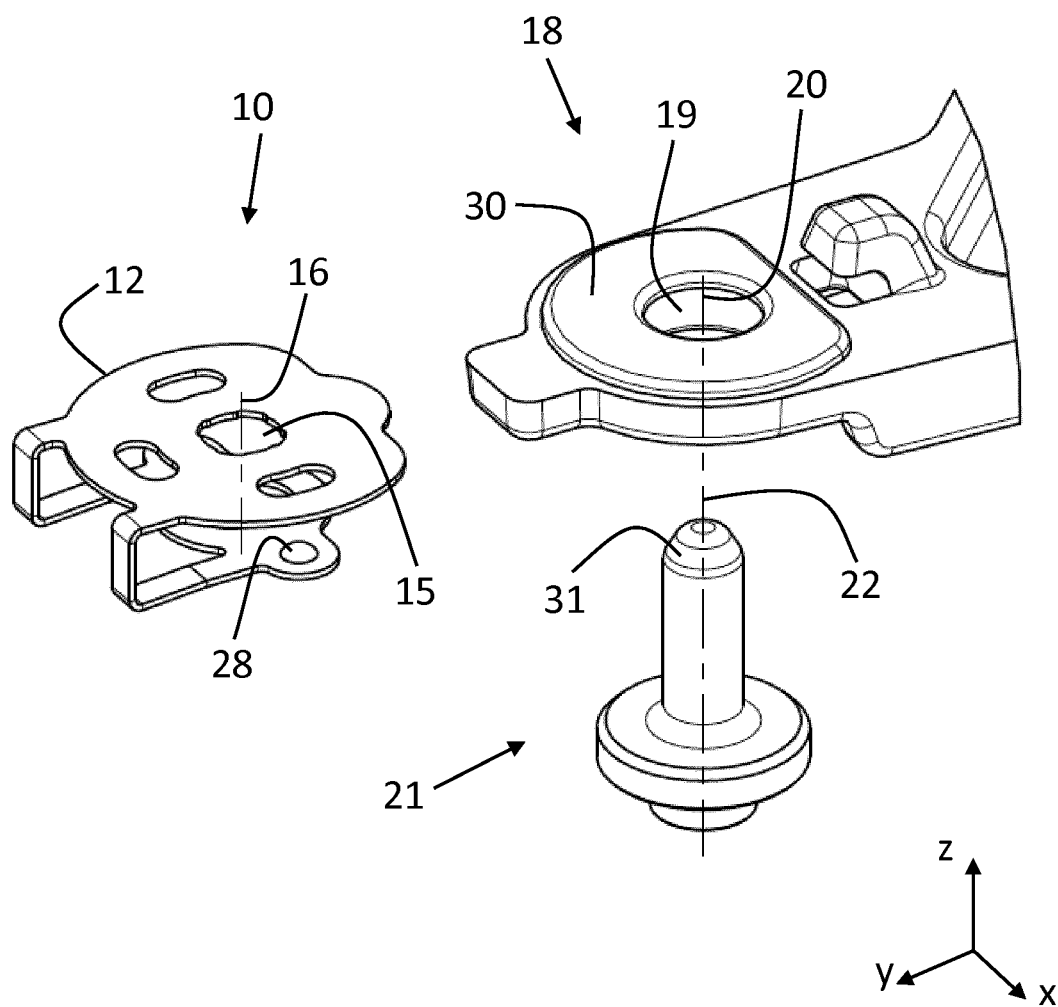
FIG. 6 shows an exploded view of a connecting device with integrated spring function according to an embodiment of the present invention.

A "receiving member" is for use with a connecting device. The receiving member has a receiving planar surface with at least one opening which can be in the form of a joining plate with a hole therein. The receiving member may be part of or be joined to an element of an optical device.

A "connecting device" is for connecting to a receiving member and the connecting device has a main body with a contact plane, the main body having at least one opening, when connected to the receiving member the contact plane faces and abuts the receiving planar surface so that the at least one opening of the connecting device overlaps the at least one opening of the receiving surface. The overlap is such that a pin can be inserted into the overlap.

A connecting device preferably has means or co-operates with means for exerting a force or pressure (such as pushing or pulling) between the contact plane of the connecting device and the receiving planar surface of the receiving member to move the contact plane towards the receiving member.

The orientation of the pin with respect to the receiving planar surface of the receiving member can vary with six degrees of freedom. For all orientations, the contact plane of the connecting device and the receiving planar surface of the receiving member can remain parallel to each other. In particular the pin and the receiving members have positions so that they orient towards each other with six degrees of freedom, the positions being limited by the overlap opening. For each position, the contact plane of the connecting device and receiving planar surfaces of the receiving member remain parallel to each other.

A "fixing compound" is a material sufficiently malleable or flowing to fill up small spaces as can exist between a pin and a hole in which the pin is located. Such a fixing compound can be a glue, an adhesive or a compound such as a potting compound. Such a fixing compound can be cured or cross-linked, e.g. it can be UV- or chemically curable. The fixing compound can be used to lock one element of a connecting system such as a receiving member to a connecting device and a pin, either by mechanical interferences or by adhesion.

DETAILED DESCRIPTION OF THE INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner.

It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

FIG. 1 shows a cross-section of an example of a prior-art system where an optical engine member in the shape of a pin 1 can be joined with an image device receiving member 2 having a hole. The hole must be big enough to provide space 8 between the pin 1 and the receiving member 2 to allow some freedom of movement for the alignment process and to deal with component/assembly dimensional tolerances. When filled with glue, space 8 will be occupied by the glue layer 3 that extends preferably all around the pin 1. Depending on the optically aligned position and/or component dimensional variations, the pin 1 and the receiving member 2 can almost certainly end up in a non-perpendicular and/or off-set position towards each other. This results in a glue layer with non-uniform thickness and/or shape around the pin, before curing.

During curing this can create asymmetrical shrinkage behaviour with the result that the fixed position of the image device can deviate from the targeted position that was obtained before curing of the glue. This unwanted "curing drift" will be observed as for example image misalignment or de-focus. Note in the case of an opto-mechanical setup, a plurality of pin/hole connections can be used in order to obtain better stability, for example 3 or 4 pin/hole connections for each image device.

FIG. 2 shows a cross-section of an example of prior-art system where an optical engine member in the shape of a pin 1 is joined with a receiving member 2 which has a hole so that a space 8 is formed between the pin 1 and the receiving member 2. Additionally a washer 4 is placed over the pin 1 and in close vicinity to the receiving member 2. The washer 4 can split up the single larger glue zone or layer 3 into two thinner glue zones or layers 5 and 6 respectively as can be seen when comparing FIGS. 1 and 2. Glue zone 5 can connect the centre hole of the washer 4 with the protruding pin 1 of the optical engine structure. Glue zone 6 can connect the washer's back side 7 with the front side 9 of receiving member 2.

FIG. 3 shows a figure from U.S. Pat. No. 6,476,986-B2 which discloses a protruding pin 104 having an attachment plate 100 going through a hole of a socket plate 108 and where a (transparent) washer 110 is added in order to reduce the glue layer thickness 112 between the washer 110 and the pin 104, when cured with light 114. The socket plate 108 in FIG. 3 corresponds to the receiving member 2 of FIG. 2, and the glue layers 112 in FIG. 3 are corresponding to the glue layers 5 and 6 of FIG. 2.

FIG. 4 shows a similar system as in FIGS. 2 and 3, but with washer 4 shown prior to assembly onto pin 1. Typically an amount of glue 40 can be added onto the backside 7 and an amount of glue 41 can be added in the centre hole 42. Alternatively, the glue 41 could be applied onto the pin 1 and the glue 40 could be applied at location 9 of member 2, instead of on washer 4 (this is not shown). In either way, the glue must be added before the washer 4 is assembled onto pin 1. To avoid long glue curing cycles and to be able to control the glue curing start point in time, typically UV-curable glue is used. Thus a washer transparent to the curing light is needed. U.S. Pat. No. 6,476,986-B2 describes how the solution is implemented with transparent washers. Typically these transparent washers are made from glass. Glass washers are more brittle, relatively expensive and increase cost of the overall implementation compared to e.g. metal washers.

A system according to U.S. Pat. No. 6,476,986-B2, illustrated in FIGS. 2; 3 and 4, has several limitations and disadvantages related to curing drift:

1) The washer 4 can be installed manually or by robotic manipulation. But in either way it is practically unavoidable that an amount of glue present in the centre hole 42 is pushed out and/or scraped off during assembly of the washer 4 onto the pin 1. This might result in air entering the glue layer 5 making it non-uniform. Such non-uniform glue layers will likely give rise to curing drift.

2) To reduce the thickness of the glue layers 6, the washer 4, mounted over pin 1, can be pushed slightly towards member 2 and at the same time the washer can be rotated around its centre axis. These actions help to squeeze out excess glue (in zone 6) and reduce the amount of potentially trapped air in glue zone 6. However, pushing against member 2 (via glue layer 6), typically destroys part of the precision alignment of member 2 relative to pin 1. Also, the amount and final location of this excess glue is very difficult to control in practice. This excess glue can create thick glue layers in and around zone 8, similar to glue layer 3 in FIG. 1, and thus create conditions for curing drift.

3) After the washer 4 (with glue added) has been assembled as described above, final alignment corrections, such as angular corrections for Scheimpflug adjustment and translational corrections for convergence and focus adjustment, can be performed. These steps make it very difficult to practically predict and control the final position of the washer 4 (relative to the pin 1 and member 2) prior to curing. When the back side 7 of the washer 4 and the front side 9 of member 2 are not parallel, the glue layers 6 will become wedge shaped, causing a high risk of uncontrolled curing drift movements. The impact of a glue wedge can be that even if the shrink percentage is equal everywhere there will be different absolute shrink values at the thin and thick side. In a corresponding way, if the centre axis 43 of the pin 1 and the centre axis 44 of the washer hole 4 are not parallel, then glue layer 5 will show radial thickness variations. In case there is a radial off-set between said axis's 43 and 44, the glue layer 5 will also show radial thickness variations. All the above mentioned glue layer conditions typically lead to a non-uniform shrinkage behaviour, affecting the achievable accuracy level of the final position of member 2 relative to pin 1.

4) In order to minimize the thickness of the glue layer 5 around pin 1, one could select a very tight clearance fit between the outer diameter of pin 1 and the inner diameter of the centre hole 42 in washer 4. "Clearance fit" in this text refers to that the hole accepts the pin without obstruction. With a "tight clearance fit", there is still no obstruction, but the space between the two components is decreased. A tight clearance fit can cause the glue to be wiped off even more during assembly of the washer 4 over the pin 1. Thus it is necessary to have at least a minimal amount of clearance to maintain enough glue for proper glue wetting of glue zone 5. Furthermore, due to manufacturing tolerance restrictions, said clearance is subject to variation. In the worst case condition, this can lead to relatively large glue layers 5 compared to the size of one image pixel. Since the curing drift is proportional to the glue layer thickness, the thickness of any non-uniform glue layer becomes more crucial as pixel sizes are getting smaller.

Overall, prior-art devices do not provide sufficient alignment accuracy after optical alignment. To overcome this, the product design using the imaging devices and/or optical engine can have an additional incorporation of delicate adjustment controls so that the most critical degrees of freedom can be readjusted again after alignment, curing and fixation of the devices to the optical engine. One example is X/Y translation and Z Rotation. This typically involves a significant number of extra components and extra procedures which significantly increase the product cost and complexity.

FIG. 5 shows an embodiment of the present invention relating to a system and method for connecting a pin and a member comprising a pin. The system and devices of FIG. 5 can be used in an optical engine wherein one member is in the shape of a pin that can be joined with an element of the optical engine such as an image device receiving member having a hole. The hole is preferably big enough to provide space between the pin and the receiving member to allow some freedom of movement for the alignment process and to deal with component/assembly dimensional tolerances. In FIG. 5, a connecting device 10 is shown that can comprise two substantially planar bodies, 11 and 12, and one, two or more connecting members 13 connecting the bodies 11 and 12. The two bodies, 11 and 12 will be substantially parallel when the receiving member is in its final position. The two bodies, 11 and 12 can be parallel or can be, for example at an angle to each other such that a force is exerted by them on the receiving member when installed due to the spring action of the members 13. FIG. 5c) shows a side view of an embodiment of the connecting device 10 where the members 11 and 12 are inclined towards each other in their resting state. Such an inclination can be applied to any of the embodiments of the present invention.

The connecting device 10 can be made of any suitable material such as metal, polymers or ceramics, or any combination of the three. Before assembly, the substantially planar bodies 11 and 12 do not need to be parallel to each other (see FIG. 5c). The inclination of the substantially planar bodies to each other can be selected to tune the spring force exerted on the receiving member. After assembly, the bodies 11 and 12 are preferably parallel to avoid variations in the clamping force while sliding in any direction in the plane of the receiving surface of the receiving member (XY plane).

The connecting members 13 can be integral with the bodies 11, 12, i.e. made from the same sheet of material. The substantially planar bodies 11 and 12 and the connecting members 13 preferably form a U-shaped device 10 having the open part of the U-shape in the form an open space diametrically opposite the connecting members 13. FIG. 5a) shows the device 10 with the body 11 upwards and FIG. 5b) shows the device 10 with the body 12 upwards. Bodies 11 and 12 can each have holes 14 and 15 respectively; each hole 14, 15 can be located near or at the centre of body 11 or 12 in which it is located. The sizes of the holes 14 and 15 do not necessarily have to be equal in size or shape, nor symmetrically positioned in relation to each other. Hole 15 can be arranged to receive a protruding pin in the overall system using a tight clearance fit. The hole 14 can provide a pre-centering function, for example, to said protruding pin so that it can guide the pin closer to its final position. As can be understood from the above, the connecting device 10 has a receiving planar surface, e.g. one of surfaces such 29 of bodies 11 or 12 with at least one opening such as hole 14 and/or 15. Preferably, the receiving planar surface is surface 29 as the surface of 11 does not need to be planar.

Figure 7:
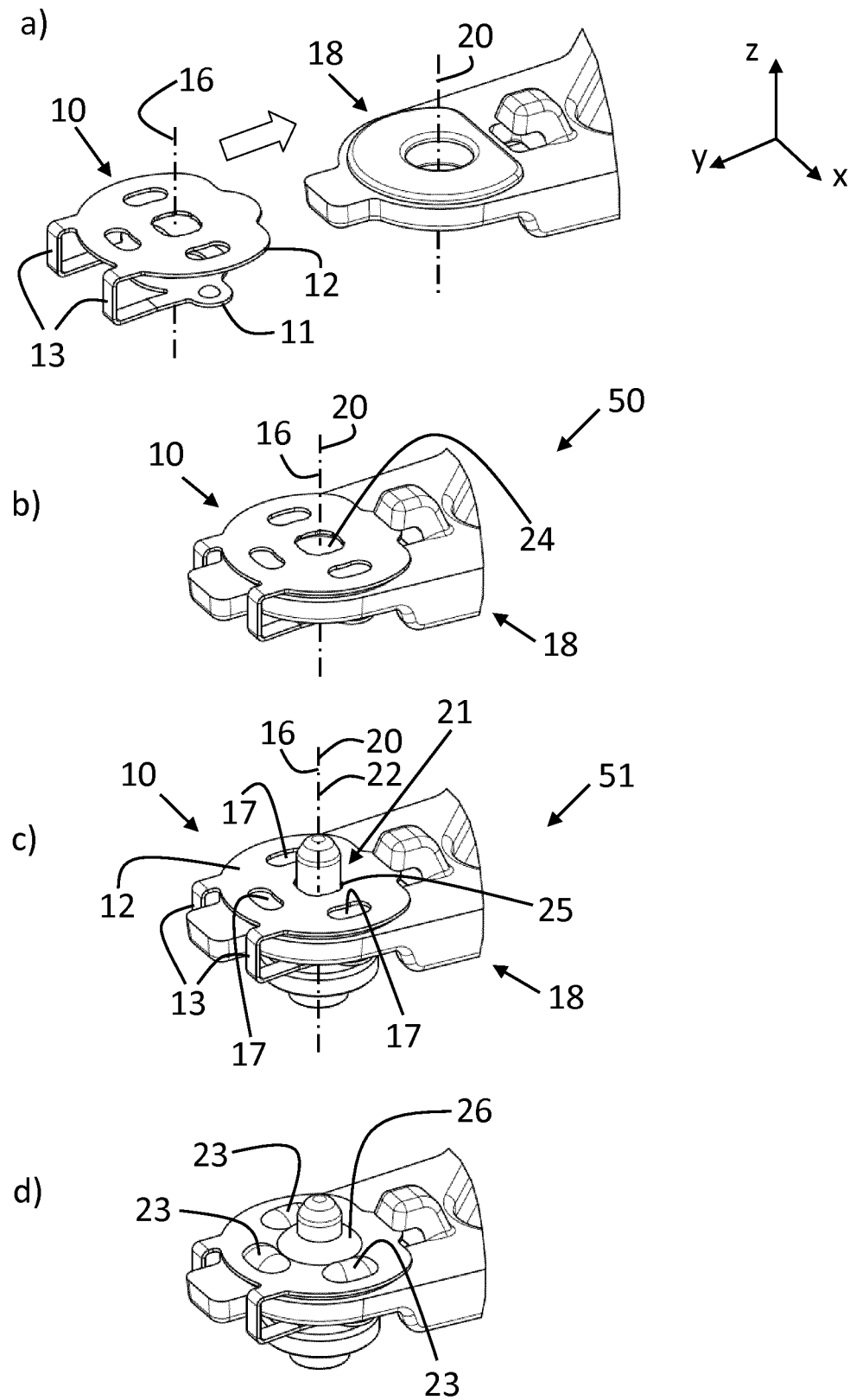
FIG. 7 shows an application sequence of a connecting system with integrated spring function according to an embodiment of the present invention.

The connecting members 13 can be one or several members joined to or integrated with bodies 11 and 12 providing an elastic spring function, which can provide a force exerted (e.g. pushing or pulling) on bodies 11 and 12 to move them towards each other once the connecting part 10 is assembled onto a member 18 (see FIG. 6 and FIG. 7).

One or more holes 17 shown located in element 12 and arranged adjacent to the hole 15 in FIG. 5b) can receive a fixing compound such as adhesive means to fix the connecting part 10 to the receiving member 18, e.g. as shown in FIG. 6 and FIG. 7. The space 25 (shown in FIG. 7c) between an outer surface of the pin 21 and the inside of the hole 15 can receive fixing means such as the adhesive means to fix the connecting part 10 to the protruding member 21.

In one embodiment, the member 11 comprises two elevated features 28 positioned next to hole 14—shown best in FIGS. 5c) and 9 to 12. The protruding side of the features 28 can be e.g. spherical or cylindrical and face towards member 12. They can provide two or more (e.g. three) well defined contact points between member 11 and a receiving surface, e.g. of member 18. They can also provide a smooth sliding behaviour in the XY plane over the surface of a receiving member 18. The XY plane is to be understood as parallel to the surface of parallel body, 12.

FIG. 6 shows an embodiment of the present invention relating to a system and method for connecting a pin and a member comprising a pin. This embodiment comprises a connecting device 10, a receiving member 18 (partially shown) and a protruding pin 21 of a second member (not shown). The connecting device 10 can connect the receiving member 18 and the protruding pin 21 of the second member. The receiving member 18 comprises a hole 19 centred on an axis 20. The connecting pin 21 can be centred on an axis 22. The pin 21 can have chamfer and/or round features 31 at one end to facilitate assembly. The holes 14, 15 and 19 can be so aligned as to create a resulting channel 24 (see FIG. 7b) that should be sufficiently big for the protruding pin 21 to be inserted into it. The smallest diameter of the channel 24 can be, for example the (inner diameter of) hole 15. The axes 16, 20 or 22 could be arbitrarily oriented towards each other e.g. parallel, coinciding or intercepting, as long as the pin 21 can be inserted into the channel 24.

FIGS. 7a) to 7d) show the steps of how to use the connecting device 10 in an embodiment of the present invention, i.e. to a system and method for connecting a pin and a member comprising a pin.

FIG. 7a) shows the connecting device 10 and the receiving member 18 prior to assembly of 10 onto 18. As shown in this drawing the device 10 is as described above with respect to FIG. 5 and FIG. 6. The receiving member 18 is as partially shown in FIG. 6 and described above. The U-shape of device 10 is such that the bodies 11, 12 can slide over the part of member 18 that includes hole 19. After installing device 10 onto member 18 e.g. by sliding the surfaces of bodies 11 and 12 are preferably parallel.

FIG. 7b) shows how the connecting device 10 can be mounted onto the receiving member 18. The side walls of the holes 14, 15 and 19 can create the side walls of the channel 24 when aligned. The bodies 11, 12 and one or more members 13 are so arranged that once member 18 is installed within the U-shaped device 10, the one or more members 13 can be deformed, preferably in its/their elastic range, so that body 12 can be pushed towards or forced or pulled against receiving member 18 while keeping surfaces 29 and 30 in contact. At the same time, body 11 can be pushed towards or forced or pulled against receiving member 18 to make contact with it via features 28. After installing device 10 onto member 18 such as by sliding the surfaces of bodies 11 and 12 are preferably parallel. The connecting device 10 and receiving member 18 now form a pre-assembled unit 50. The constant presence of the clamping force provided by members 13 operating on bodies 11, 12 can keep the connecting device 10 assembled onto member 18. No glue is involved at this stage.

FIG. 7c) shows how the pin 21 can be added to the pre-assembled unit 50 by inserting it into the channel 24 (either from the top or the bottom) so that it forms a pre-assembled system 51. The members 18 and 21 of system 51 have mobility towards each other with six degrees of freedom and the system can be aligned into an arbitrary position. Throughout such a movement, the connecting device 10 stays in close contact with the receiving member 18. The bodies 11, 12 of connecting device 10 are arranged such that device 10 is permitted to adjust its position with respect to member 18 by being allowed to slide over the receiving member 18 in any direction in order to follow the XY movements that the pin 21 makes relative to member 18, e.g. during an alignment and insertion process. After installing device 10 onto member 18 such as by sliding the surfaces of bodies 11 and 12 are preferably parallel. The possibility to move the members 18 and 21 relative to each other without altering the distance between the connecting device 10 and the member 18 to which it is to be attached is an important aspect of the present invention.

Elements 18 and 21 have 6DOF with respect to each other. Member 10 can have limited DOF towards 18 and/or 21.

During such a method step, the surface 29 is kept in contact with surface 30, due to the clamping force provided by members 13 acting on bodies 11, 12 of connecting device 10. Because of the arrangement of hole 15 and pin 21 and the provision of a clearance fit between hole 15 and pin 21, a movement of pin 21 in Z-direction (perpendicular to the plane defined by parallel body 11 and/or 12) relatively to device 10 and member 18 is possible. The typical clamping force of device 10 can be engineered such that any Z-components of friction forces, acting on the inner contour of hole 15, are not able to overcome the clamping force of device 10. Also, during a translation in direction Z of member 18, surface 29 is kept in contact with surface 30.

FIG. 7d) shows how a fixing compound such as adhesive or glue or a potting compound can be applied to system 51, which may have been initially aligned before the fixing compound such as glue or adhesive or potting compound application. The fixing compound such as glue or adhesive or potting compound can for example be applied on the holes 17 and along the space 25 between the outer diameter of pin 21 and the inside diameter of hole 15. The fixing compound such as glue or adhesive or potting compound being applied on a hole can take the shape of a "mushroom" with a "hat". For example, reference number 23 can be seen as the "hat" primarily visible on the surface and a "foot" primarily filling the volume of hole 17 under the hat (see FIG. 10 or 12 for best view). The extent of the further penetration into cavities in the vicinity of the "foot" may depend on capillary forces and the properties of the fixing compound such as glue, adhesive or potting compound. Because the surfaces 29 and 30, surrounding the holes 17, are in close contact, the resulting thickness of the fixing compound such as glue or adhesive or potting compound penetrating the cavities will be small and resulting variations in shrinking of the fixing compound such as glue, adhesive or potting compound will be negligible. Glue or adhesive will adhere to surfaces but potting compound does not need to do this and can function simply by creating a shape that is locked onto the available spaces by mechanical interference.

The fixing compound such as glue or adhesive or potting compound applied around pin 21 can take the shape of a ring 26, primarily visible on the surface. The fixing compound such as glue or adhesive or potting compound 26 can also penetrate into space 25, being the space between pin 21 and the hole 15, (see FIG. 9 or 11). The penetration of the fixing compound such as glue or adhesive or potting compound 26 into these cavities may depend on capillary forces and the properties of the fixing compound such as glue or adhesive or potting compound. The presence of fixing compound such as glue or adhesive or potting compound in this space can be beneficial since movement due to curing drift is much less than the corresponding movement limited by the clearance fit.

Since the clearance fit between hole and pin can be engineered to be very tight, fixing compound such as glue or adhesive or potting compound penetration (into space 25) can be limited in direction of the negative Z axis. It is therefore acceptable to introduce notches in the side walls of the hole 15. FIG. 13 shows an embodiment of the present invention where a plurality of additional notch features 32 with bigger clearance can be provided around hole 15. Because two opposite notch features 32 along hole 15 will be filled with fixing compound such as glue or adhesive or potting compound, the resulting difference in fixing compound such as glue or adhesive or potting compound layer thickness around the pin 21 (in radial direction) will be limited to the clearance fit value. Hence, the walls of at least one hole of the connecting device can have notches.

A final 6DOF (6 degrees of freedom) alignment can be performed just after the fixing compound such as glue or adhesive or potting compound has been added. If UV-curing glue or adhesive or potting compound is used, it can then be cured with UV-light. Since there is no structure covering the glue or adhesive or potting compound, also non-transparent materials (e.g. metal) are suitable for the connecting device.

In the above a connecting device 10 has been described having a main body 11, 12, 13 with a contact plane, this main body having at least one opening 14 or 15. The connecting device 10 is placed with the contact plane towards the receiving planar surface of a receiving member 18 so that an opening 14 or 15 of the connecting device 10 overlaps with an opening 19 of the receiving surface of the receiving member 18. The pin 21 is inserted into and through the overlap portion of the overlapping holes. The connecting device 10 also has means 13 in co-operation with parallel bodies 11 and 12 for exerting a force (e.g. pushing or pulling) between the contact plane of the connecting device 10 and the receiving planar surface of the receiving element 18 to move the contact plane towards the receiving planar surface, wherein the orientation of the pin towards the receiving planar surface can vary within six degrees of freedom. The means for exerting the force (e.g. pushing or pulling to move the contact plane towards the receiving planar surface) between the contact plane of the connecting device 10 and the receiving planar surface of the receiving element 18 can be of mechanical-, magnetic-, gravitational-, electromagnetic-, electrostatic-, adhesive or of pressure differential nature, or any combination of the seven. The means for exerting a force (e.g. pushing or pulling) between the contact plane of the connecting device 10 and the receiving planar surface of the receiving member 18 (to move the contact plane towards the receiving planar surface) can be attached to or be part of the connecting device 10. The means for exerting a force (e.g. pushing or pulling) between the contact plane and the receiving planar surface to move the contact plane towards the receiving planar surface can comprise an elastic member 13 that is integrated with the connecting device so that it clamps the connecting device to the receiving member.

For all orientations, the contact plane of the connecting device 10 (which can have at least three contact points) and the receiving planar surface of the receiving member 18 remain parallel to each other.

Although all the holes mentioned above are shown as enclosed at least one of these does not need to be fully enclosed. Although not shown the means for exerting a force (e.g. pushing or pulling) between the contact plane of the connecting device and the receiving planar surface of the receiving member 18 to move the contact plane towards the receiving planar surface, can be provided by either of both of these or provided externally, for example by an alignment machine.

FIG. 8a) shows a flow chart of a prior-art method. Step 60 of FIG. 8a) comprises a pre-assembly of the system, followed by step 61 where an initial alignment in up to six degrees of freedom can be made. In step 62, glue is added on to one or more washers, which are then assembled onto the system in step 63. A final alignment in up to six degrees of freedom can be made in step 64. The glue can then be cured in step 65. If glue is applied to the system before alignment, it can be redistributed during the alignment. Additionally, if there is no control of the shape of the size of the cavities where glue can penetrate, there can be formation of glue wedges which give rise to curing drift. Further, if the amount of glue that can penetrate such cavities is not limited, the whole cavity can be filled with glue and the curing drift is further increased.

Figure 8B:
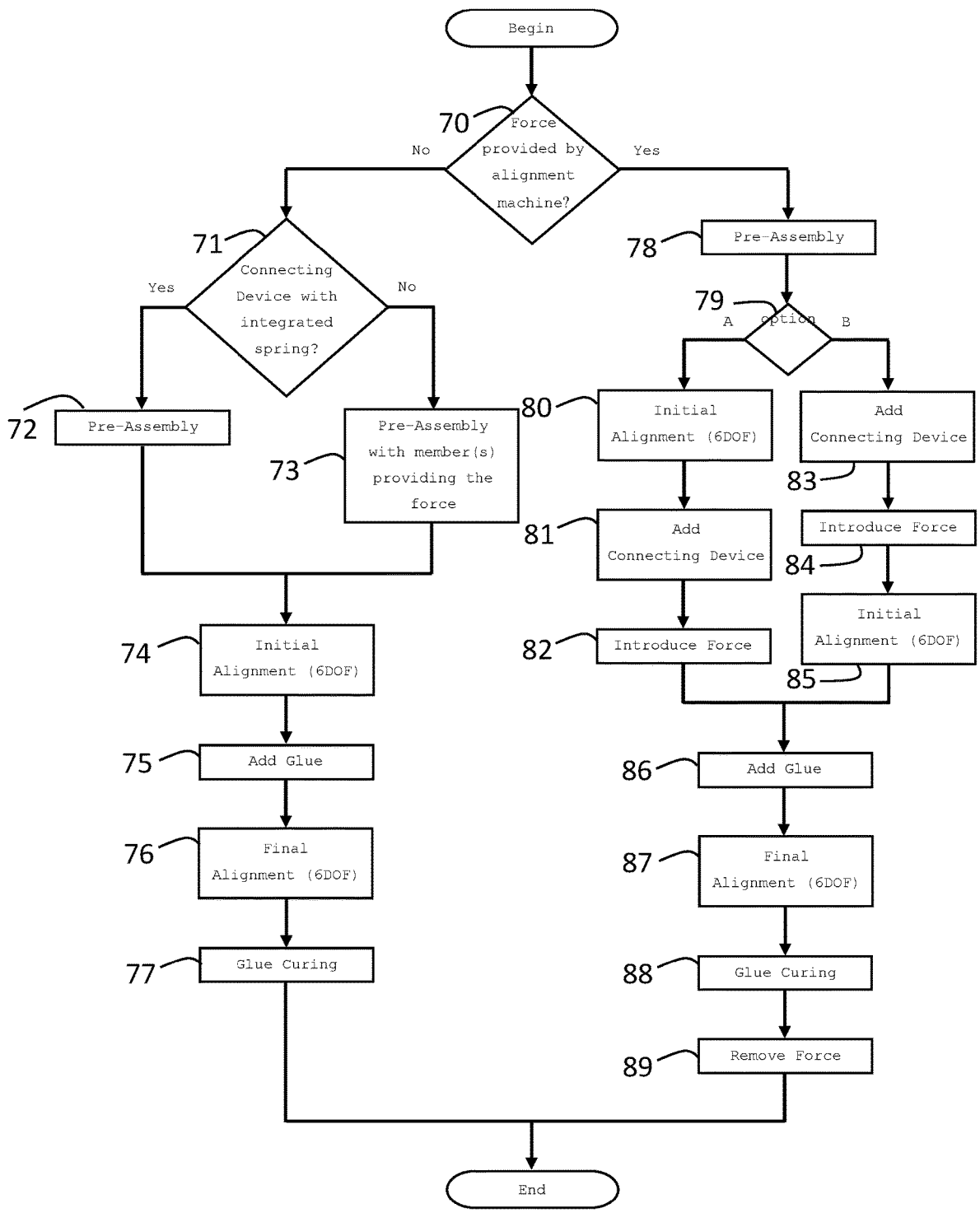
FIG. 8b) shows a flow chart according to embodiments of the present invention.
Figure 16:
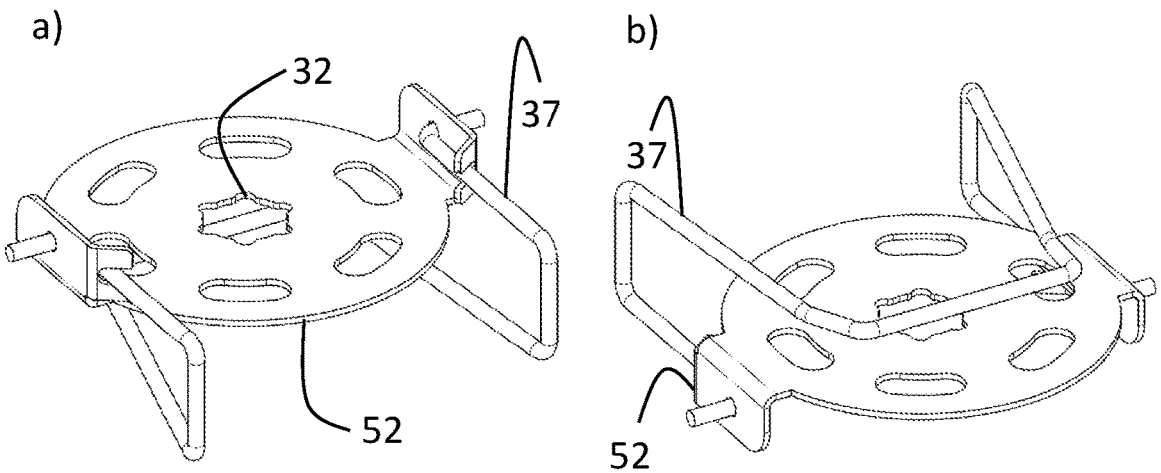
FIG. 16 shows an example of a connecting device where means for generating the force is attached to the member 12 according to an embodiment of the present invention.

FIG. 8b) shows flowcharts of one or more embodiments of the present invention. The means for keeping surfaces 29 and 30 in parallel or in contact with each other could be a force that can be applied by members integrated with the connecting device 10 or members located externally, for example in an alignment machine; whereby the selection of one of these such as members located externally or not can be made in step 70. If there is no externally provided force then means to provide such force can be integrated with the connecting device 10. Such a determination is made in step 71 of implementation. The force could be provided by an external spring 37 that can be manufactured separately and pre-assembled 73 to a separate member 52, as shown in FIG. 16 in order to achieve a pre-assembled system as in 51.

Figure 17:
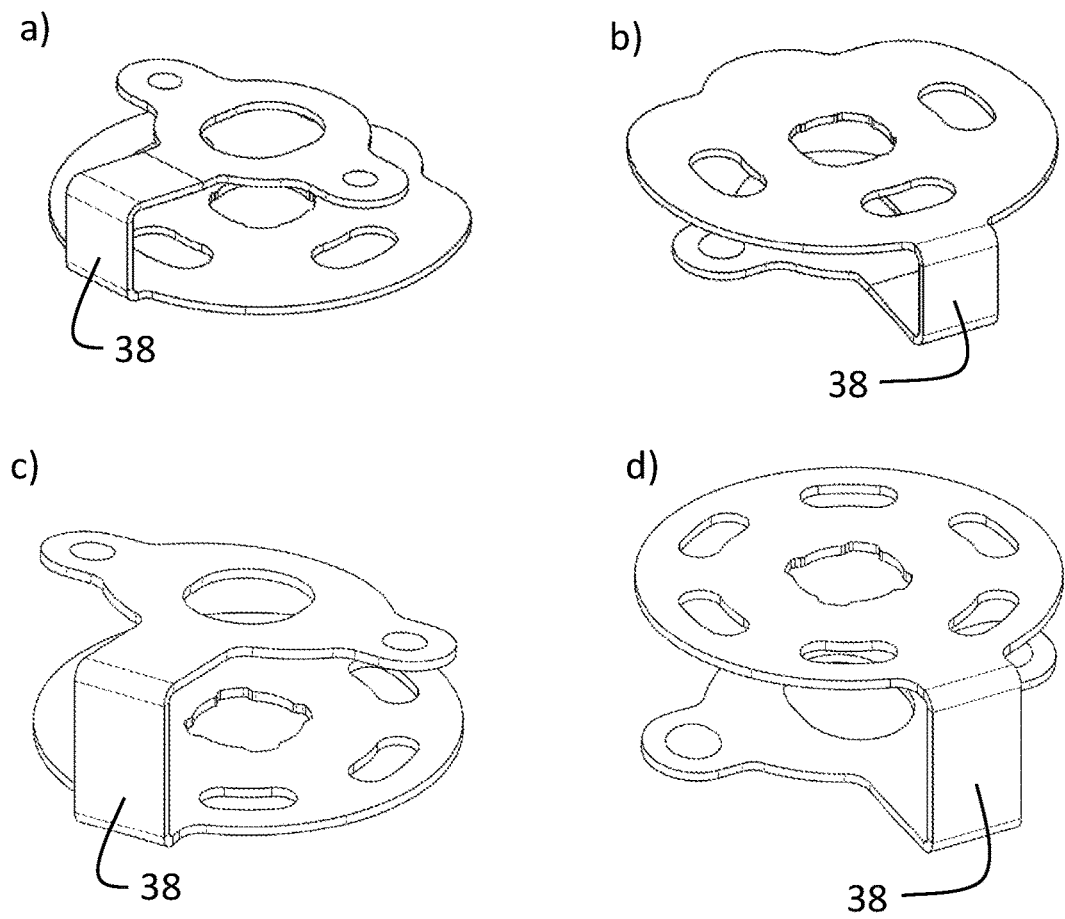
FIG. 17 shows examples of connecting devices with a single connecting member according to an embodiment of the present invention.

Or the force could be provided by one or several springs 13 that is/are integrated with the connecting device 10, as shown in FIG. 5 and/or FIG. 6 and/or FIG. 7. FIG. 17 (a, b, c or d) shows an example where only one spring member 38 is used. The device of FIG. 17 (a, b, c or d) has two bodies with a gap there between. The two bodies 11, 12 are linked by a single spring member 38. The two bodies 11 or 12 of FIG. 17 (a, b, c or d) enclose a space which can receive the receiving member 18. The bodies have at least one hole for insertion of a pin. As shown in FIGS. 17*a-d*) the inside surface of at least one hole can have notches.

With any embodiment of the present invention, there can be an initial alignment between the receiving member 18 and the member 21 performed in up to six degrees of freedom, in step 74. After the system is initially aligned, fixing compound such as glue or adhesive or potting compound can be applied, in step 75, and a final alignment can be made in step 76, before the fixing compound such as glue or adhesive or potting compound can be cured in 77.

Returning to FIG. 8*b*), the means for providing a force to keep surfaces 29 and 30 together can also be provided externally, for example with a tool in an alignment machine. For this alternative, a pre-assembly step 78 is first made and a selection of which optional route is to be selected can be made in step 79. There can be an initial alignment in step 80 in up to six degrees of freedom, followed by the addition of the connecting device 10 in step 81 and further a force can be introduced in step 82 to keep 29 and 30 in parallel or in contact. In an alternative embodiment the pre-assembly step 78 can be followed by the immediate addition of a connecting device 10 in step 83 and then a force can be introduced in step 84, and the configuration can be submitted to an initial alignment in up to six degrees of freedom in step 85. The two alternatives starting from step 78 can end in a common path comprising the steps of adding fixing compound such as glue or adhesive or potting compound in step 86, performing a final alignment in up to six degrees of freedom in step 87, curing the fixing compound such as glue, adhesive or potting compound in step 88 and optionally removing the force that keeps surfaces 29 and 30 in parallel or in contact with each other, in step 89.

The steps in FIG. 8*b*) have the advantage that the fixing compound such as glue or adhesive or potting compound can be applied after initial alignment, so that there can be no re-distribution of fixing compound such as glue or adhesive or potting compound during initial alignment. In the case of alignment after fixing compound such as glue or adhesive or potting compound has been introduced, there is the benefit of keeping the amount of fixing compound such as glue or adhesive or potting compound that can enter between the surfaces 29 and 30 to substantially zero, or to a very small amount. Further, the fixing compound such as glue or adhesive or potting compound that enters will get a uniform distribution. This will minimize curing drift.

FIGS. 9 to 19 all show modifications to the above embodiments. The members shown in FIGS. 9 to 12 are the same design as used in FIGS. 6 and 7.

FIGS. 9 to 12 all show a device or system for connecting a pin and a member comprising a pin, and a receiving member having a receiving planar surface with at least one opening. FIGS. 9 to 19 show a system that can be used in an optical engine wherein a member in the shape of a pin can be joined with an image device receiving member having a hole. The hole must be big enough to provide space between the pin and the receiving member to allow some freedom of movement for the alignment process and to deal with component/assembly dimensional tolerances. A connecting device is provided having a main body with a contact plane, said main body having at least one opening, where the connecting device is placed with the contact plane towards the receiving planar surface of the receiving member so that an opening of the connecting device overlaps an opening of the receiving surface of the receiving member, and the pin is inserted into said overlap. The connecting device further comprises means for exerting a force or pressure (e.g. pushing or pulling) between the contact plane of the connecting device and the receiving planar surface of the receiving member to move the contact plane towards the receiving planar surface, wherein the orientation of the pin towards the receiving planar surface of the receiving member can vary with six degrees of freedom, and for all orientations, the contact plane of the connecting device and the receiving planar surface remain parallel to each other. The contact plane can comprise at least three contact points. Also for all orientations, the contact plane of the connecting device and the receiving planar surface stay in contact with each other.

In any of these designs at least one hole need not be fully enclosed.

In any of these designs the means for exerting a force or pressure (e.g. pushing or pulling) between the contact plane of the connecting device and the receiving planar surface of the receiving member to move the contact plane towards the receiving planar surface, is of mechanical-, magnetic-, gravitational-, electromagnetic-, electrostatic-, adhesive or of pressure differential nature, or any combination of the seven.

Figure 9:
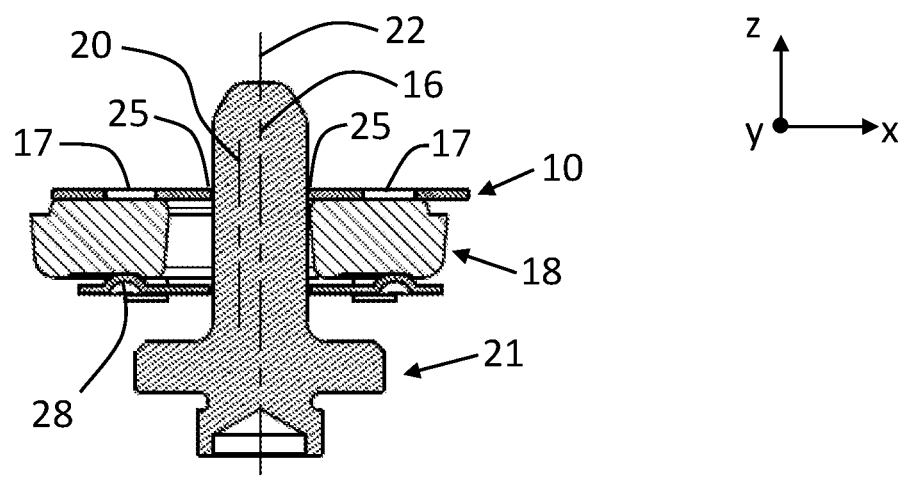
FIG. 9 shows a cross-section of a translated position of the pin according to an embodiment of the present invention.

For example, FIG. 9 shows a cross section of a further embodiment of the present invention relating to a system or device for connecting a pin and a member comprising a pin, and a receiving member having a receiving planar surface with at least one opening. The connecting device 10 has a main body with a contact plane, said main body having at least one opening, where the connecting device is placed with the contact plane towards the receiving planar surface of a receiving member 18 so that an opening of the connecting device 10 overlaps with an opening of the receiving surface of the receiving member. The connecting device 10 can be mounted onto the receiving member 18 and the pin 21 can be inserted in the resulting channel 24. The pin is inserted into said overlap. The connecting device also has means (not shown) for exerting a force (e.g. pushing or pulling) between the contact plane of the connecting device 10 and the receiving planar surface to bring them together, wherein the orientation of the pin towards the receiving planar surface can vary with six degrees of freedom, and for all orientations, the contact plane of the connecting device 10 and the receiving planar surface of the receiving member remain parallel to each other.

The system can be initially aligned. The initial alignment can result in that the pin 21 is highly asymmetrically positioned within the hole 19. The axes 16, 20 and 22 can be situated parallel to each other but axis 22 may have an off-set to the right compared to axis 20. In general, a parallel off-set can extend in any direction within the XY plane.

Figure 10:
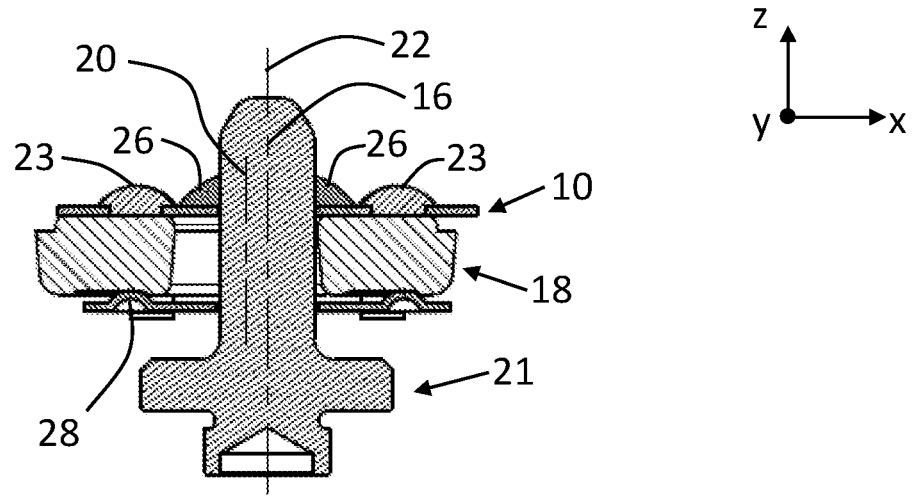
FIG. 10 shows a cross-section of a translated position of the pin where glue has been added according to an embodiment of the present invention.

FIG. 10 illustrates a variation of embodiment of the present invention described above with respect to FIG. 9. When the alignment has been performed, fixing compound such as glue (or adhesive or potting compound) 23 and 26 can be added to dedicated holes, e.g. such as 17 and/or 25.

Figure 11:
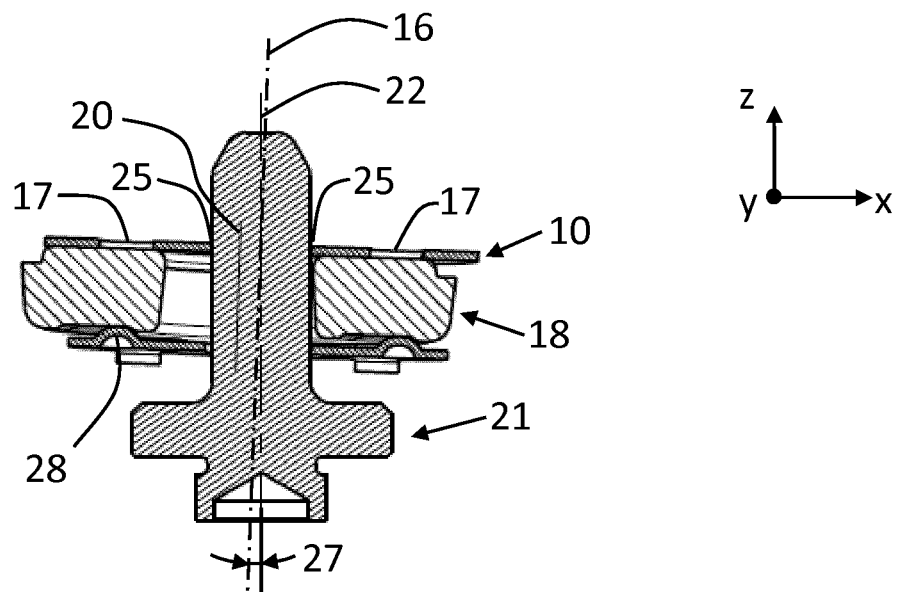
FIG. 11 shows a cross-section of a translated and tilted position of the pin according to an embodiment of the present invention.

FIG. 11 illustrates a further variation of the embodiment of the present invention shown in FIG. 9. During the alignment, the member 18 and the pin 21 can be tilted in two directions, around the X axis and/or around the Y axis, and at the same time shifted in the XY plane. This is determined by the relationship between the size of the holes through which the pin 21 is inserted and the outer diameter of the pin 21

Figure 12:
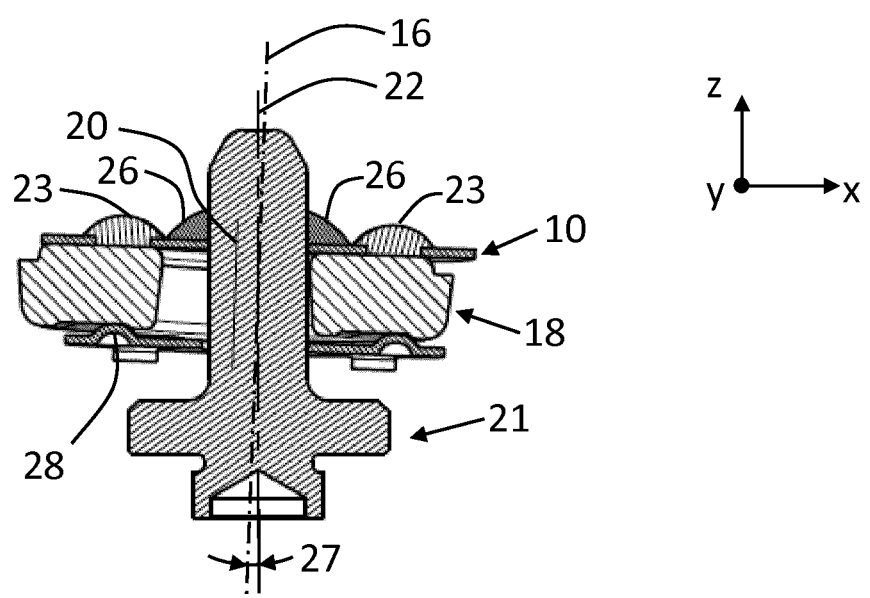
FIG. 12 shows a cross-section of a translated and tilted position of the pin where glue has been added according to an embodiment of the present invention.

FIG. 12 illustrates a variation of the embodiment of the present invention illustrated in FIG. 11. After the alignment has been performed, fixing compound such as glue or adhesive or potting compound 23 and 26 have been added to fix the system in its aligned position.

An advantage of embodiments of the present invention is that they can avoid or reduce an asymmetrical configuration after the alignment, such as can occur with a prior-art system, which would give rise to asymmetrical glue distribution. This would in turn result in asymmetrical shrinking and curing drift. The present invention avoids this problem since the fixing compound such as glue or adhesive or potting compound distribution is practically independent of the asymmetrical alignment.

In another embodiment of the present invention (not shown) the means for keeping surfaces 29 and 30 in contact with each other can be provided by a member integrated with the receiving structure 18 or with any structure whereupon the pin 21 is mounted.

In yet another embodiment of the present invention (not shown), the means for keeping surfaces 29 and 30 in contact with each other can be externally provided, e.g. by the alignment machine.

FIGS. 13, 14 and 15 show further examples of embodiments of the present invention. The different bodies can correspond to member 12 of connecting device 10 but can also be used stand-alone, if the means for keeping surfaces 29 and 30 in contact with each other are provided externally.

Rotation Around Direction Z

A rotation of the pin 21 around its axis 22 or a rotation of receiving member 18 around axis 20 can be possible because of the clearance fit with hole 15. The rotation has no significant effect on the position of device 10. Also here, during a rotation around direction Z of receiving member 18, surface 29 keeps contact with surface 30, even if device 10 would rotate a bit around direction Z due to friction components.

Rotation Around X and Y

The angular freedom between a centre axis 22 of pin 21 and a centre axis 16 of hole 15 of a member 10 can be calculated as a function of:
the outer diameter of pin 21
the inner diameter of hole 15
the thickness of body 12.

Despite a tight clearance fit between pin 21 and hole 15, rotations around the X and Y axis of the pin 21 can be possible due to that the thickness of member 12 where it can make contact with pin 21 is small. The rotational freedom around X and/or Y needed during optical alignment is typically limited. So enough angular freedom can be provided.

An advantage of the present invention over prior-art is that the fixing compound such as glue or adhesive of potting compound can be applied after the assembly of 51 and that the largest part of the fixing compound such as glue or adhesive of potting compound will be located on top of the assembly. Since light can access the fixing compound such as glue or adhesive of potting compound, there is no limitation in material choice for the connecting device 10 so that both transparent and opaque materials (e.g. metals, ceramics, non-transparent oxides or polymers) can be used.

With this broad selection of materials, the connecting device can be made locally very thin, for example in the region where it makes contact with the protruding pin. Moreover, it is generally more feasible to achieve a better dimensional accuracy in a thin body compared to a thicker body. A precise through-hole in a sheet metal body can e.g. be made by etching, laser cutting or stamping. A precise through-hole in a thicker glass body might involve drilling and/or grinding. The advantage is that a tighter clearance fit results in a thinner fixing compound such as glue or adhesive of potting compound layer 5, which in turn decreases curing drift.

After the initial alignment, the axes 16, 20 and 22 could be arbitrary oriented towards each other, for example being neither parallel nor overlapping in relation to each other.

FIG. 13 shows an example with local notches 32 in the perimeter of hole 15. The number of notches may be e.g. 4 or more or is as required.

FIG. 14 shows examples of different variations of shape and layout of the holes 15 and/or 17. FIG. 14c) has a rectangular centre hole 33 that could be used in combination with a rectangular protruding pin. Any other cross-sectional shape of the centre hole is also possible.

FIGS. 15a) and 15b) shows cross-sectional views of embodiments of the present invention where the thickness of member 12 is locally reduced at the rim of hole 15. FIG. 15a) shows a stepwise reduction 34 and FIG. 15b) shows a continuous reduction 35.

This allows a tighter clearance fit without influencing the angular freedom of the pin.

FIG. 15c) shows the pin tilt angle alfa, the hole wall thickness t, the hole diameter D and the pin diameter d (and the clearance D-d). When the wall thickness t decreases, a larger pin tilt angle alfa is possible or, when the thickness t decreases; a tighter clearance fit is made possible for the same pin tilt angle. FIG. 15c) shows a local thickness reduction and is a detailed schematic view to understand the pin tilt relation with other parameters.

The embodiment of FIGS. 15a) and 15b) show subject matter that can be an independent invention.

FIG. 15b) shows an example of how the side walls of the surrounding holes 36 may be drafted so that the wall can have an inclination towards the bottom of the hole. One advantage with a drafted hole can be to achieve a higher fixing compound such as glue or adhesive or potting compound retention strength, e.g. due to an undercut of device 10 towards the fixing compound such as glue or adhesive of potting compound. So this embodiment can bring at least one or any combination of the advantages of
  a smaller contact surface between the pin and the hole so that the clearance fit can be made smaller, and/or
  a higher fixing compound retention strength such as glue, adhesive or potting compound retention strength in holes 36 due to the undercut,
  and/or
  manufacturing processes, e.g. the draft angle will create a release angle in case injection moulding technologies are used.

As shown in FIG. 15 (see for example FIG. 15c) an independent invention is a system for connecting a pin and a member comprising a pin, the system comprising a receiving member having a receiving planar surface with at least one opening, a connecting device having a main body with a contact plane, said main body having at least one opening whereby the connecting device is placed with the contact plane towards the receiving planar surface so that the at least one opening of the connecting device overlaps the at least one opening of the receiving surface, and the pin is inserted into said overlap, wherein the system has at least one drafted opening.

Also as shown schematically in FIG. 15c) an independent invention is a method for connecting a pin and a member comprising a pin, and a receiving member having a receiving planar surface with at least one opening, a connecting device having a main body with a contact plane, said main body having at least one opening, the method comprising placing the connecting device with the contact plane towards the receiving planar surface so that the at least one opening of the connecting device overlaps the at least one opening of the receiving surface, and inserting the pin into said overlap, wherein at least one opening is a drafted opening.

FIG. 16 shows an example of an embodiment of the present invention where the means for keeping surface 29 and 30 in contact, can be provided by an external member 37 assembled onto member 12. Advantages with this solution could be e.g. to facilitate manufacturing and to reduce cost. The spring feature 37 can be separately manufactured and then assembled to a single part 52 that corresponds to 12 of the connecting device 10. This embodiment also shows an alternative configuration of local notches 32 in the centre hole.

FIG. 17 shows examples of two embodiments of the present invention where the means for keeping surface 29 and 30 in contact can be provided by a single connecting member 38. The b) and d) figures show different configuration of member 12. The a) and c) shows the same devices viewed from below.

FIG. 18 shows examples of embodiments of the present invention where the hole in member 11 can be replaced with an opening 39 which is not completely closed. In another embodiment (not shown) the member 18 could comprise an opening 19 that is not completely enclosed.

FIG. 19 shows examples of embodiments of the present invention where in a) the centre hole in member 12 can be cross shaped and the fixing compound such as glue holes 17 do not have to be closed, and in b) the connecting members 13 are not sharing the same member 11, and are also located opposite each other.

FIG. 20a-c) show further embodiments of the present invention wherein a "spring function" provided with, e.g. is connected to the pin. In these drawings body 11 is not shown. FIG. 20 shows an embodiment of the present invention relating to a system and method for connecting a pin and a member comprising a pin. The system and devices of FIG. 20 can be used in an optical engine wherein one member is in the shape of a pin that can be joined with an element of the optical engine such as an image device receiving member having a hole. The hole is preferably big enough to provide space between the pin and the receiving member to allow some freedom of movement for the alignment process and to deal with component/assembly dimensional tolerances. In FIG. 20a-c), a connecting device 10 is shown that can have one substantially planar body, 12. Instead of one, two or more connecting members 13 the means for exerting a force is provided by an element 45.

The connecting device 10 can be made of any suitable material such as metal, polymers or ceramics, or any combination of the three.

Body 12 has a hole located near or at the centre of body 12. This hole is arranged to receive a protruding pin 21. The hole can provide a pre-centering function, for example, to said protruding pin so that it can guide the pin closer to its final position. As can be understood from the above, the connecting device 10 has a receiving planar surface, e.g. one of surfaces body 12 with at least one opening. The member 45 provides an elastic spring function, which can provide a force exerted (e.g. pushing or pulling) on body 12 to move it towards the receiving member 18.

FIG. 20a) shows an alternative embodiment of the means for exerting a force (45) between the contact plane "12" of the connecting device 10 and the receiving planar surface 30 of the receiving member 18. It comprises extensions 47 that "click into" the grooves 48 of the pin 21. The supports 46 rest on the member "12", for example in FIG. 20c). FIG. 20b) shows how member "12" is mounted onto the receiving member 18 and the pin 21 has been inserted through channel 24. Member 45 is then added on top of "12" as shown in FIG. 20c).

The described examples should not limit the present invention. For example the shape, size and position of the centre hole 15 can differ. The hole 15 can for example take any shape that matches to a protruding element, e.g. round, rectangular, square, cross, etc. The shape, size, amount and position of the holes 17 or openings as 39 may also differ. In one extreme situation it could be possible to work without fixing compound such as glue holes 17 and apply glue on the outer edges of planar body 12. To allow this, surface 30 of member 18 could be made bigger than member 12. The shape, size, quantity and position of the local notches around the hole 15 can also differ or they can be absent.

The connecting members 13, if present, can also differ in shape, size, quantity and position. As described above they can be integrated in member 11 and 12 or they can be external from 11 and 12. Body 11 could be split up in several bodies, each being connected by an individual member 13 to planar body 12.

The protruding features 28 of body 11, if present, can also differ in shape, size, quantity and position. They are also not limited to a specific shape but could be e.g. spherical, cylindrical, etc. Furthermore, they could be provided by additional members assembled onto member 11. Although less ideal, the features 28 could be provided onto member 18.

The means for keeping surfaces 29 and 30 into permanent contact prior to adding of the fixing compound such as glue and during curing of fixing compound such as glue, can be provided by the connecting device 10, or can be provided by the alignment tool. The means could even be provided by a member of member 18 or a member of an optical engine. The character of the above mentioned means can be a mechanical force, e.g. as in the case of members 13. An alternative implementation could be to use an air-pressure differential, a magnetic force or gravity, etc. A combination of all alternative means could of course also be used.

The means could even be provided by a member, assembled onto the protruding member 21, after the pre-assembled system 51 is made.

The invention claimed is:

1. A connecting and aligning system, the system comprising:
    a pin and a receiving member having a receiving planar surface with at least one opening being big enough to provide space between the pin and the receiving member to allow freedom of movement for an alignment process, and
    a connecting device having a main body with a contact plane, said main body having at least one major surface lying in the contact plane and at least one opening whereby the connecting device is placed with the contact plane towards the receiving planar surface so that the at least one opening of the connecting device overlaps the at least one opening of the receiving surface, to create a channel, and the pin is inserted into said channel in a direction orthogonal to the at least one major surface, said system further comprising means for exerting a force between the at least one major surface lying in the contact plane of the connecting device and the receiving planar surface of the receiving member, wherein the orientation of the pin with respect to the receiving planar surface of the receiving member can vary with six degrees of freedom in the alignment process and the connecting device is configured to slide over the receiving member in a lateral movement, and for all orientations, the at least one major surface lying in the contact plane of the connecting device and the receiving planar surface of the receiving member remain parallel to each other, wherein orientation of the pin varying with six degrees of freedom in the alignment process includes a center axis of the pin being able to be shifted laterally in the at least one opening with respect to a center axis of the channel to create an offset, and wherein the pin and receiving member are configured in a way to be able to be fixed with the offset between the center axis of the pin and the center axis of the channel after the alignment process, wherein only sidewalls of the at least one opening of the connecting device and the at least one opening of the receiving surface create sidewalls of the channel when aligned.

2. The system according to claim 1 wherein the contact plane comprises at least three contact points for contacting the receiving planar surface.

3. The system according to claim 1 wherein for all orientations of the pin, the contact plane of the connecting device and the receiving planar surface of the receiving member stay in contact with each other.

4. The system according to claim 1 wherein the at least one opening of the connecting device is selected from:
the at least one opening not being fully enclosed, and
the at least one opening of the main body of the connecting device is of any shape, and
the at least one opening of the main body of the connecting device is circular, oval, square, rectangular or triangular or any combination of any of the five and the at least one opening of the main body of the connecting device has walls with notches.

5. The system according to claim 1 wherein the means for exerting a force between the contact plane of the connecting device and the receiving planar surface of the receiving member is selected from:
the means for exerting a force being of mechanical-, magnetic-, gravitational-, electromagnetic-, electrostatic-, adhesive or of pressure differential nature, or any combination of any number of the seven, and
the means for exerting a force between the contact plane of the connecting device and the receiving planar surface of the receiving member, is provided externally, and
the means for exerting a force between the contact plane of the connecting device and the receiving planar surface of the receiving member is attached to the pin or to the connecting device.

6. The system according to claim 5 wherein the means for exerting a force between the contact plane and the receiving planar surface of the receiving member comprises an elastic member that is integrated with the connecting device or is attached to the receiving member so that it clamps the connecting device to the receiving member.

7. The system according to claim 6 wherein the means for exerting a force between the contact plane and the receiving planar surface of the receiving member comprises at least one second surface, distant from the contact plane, and at least one elastic member connecting the at least one second surface with the contact plane.

8. The system according to claim 7 wherein the second surface has spherical or cylindrical elevations that make contact with the receiving member.

9. The system according to claim 1 wherein a height of the sidewalls of the at least one opening of the main body of the connecting device is smaller than a thickness of the rest of the connecting device.

10. The system according to claim 1 wherein the connecting device has members that are inclined towards each other in their resting state.

11. A method for connecting and aligning a pin and a receiving member, said receiving member having a receiving planar surface with at least one opening being big enough to provide space between the pin and the receiving member to allow freedom of movement for an alignment process, and a connecting device having a main body with a contact plane, said main body having at least one major surface lying in the contact plane and at least one opening, the method comprising:
placing the connecting device with the contact plane towards the receiving planar surface so that an opening of the connecting device overlaps an opening of the receiving surface, to create a channel, and inserting the pin into said channel in a direction orthogonal to the at least one major surface,
exerting a force between the at least one major surface lying in the contact plane of the connecting device and the receiving planar surface,
aligning the pin towards the receiving planar surface by varying the pin with six degrees of freedom in the alignment process wherein the connecting device is slid over the receiving member in a lateral movement, and for all orientations, the at least one major surface lying in the contact plane of the connecting device and the receiving planar surface of the receiving member remain parallel to each other,
wherein aligning the pin includes shifting a center axis of the pin laterally in the at least one opening with respect to a center axis of the channel to create an offset, and
fixing the offset between the center axis of the pin and the center axis of the channel after the aligning,
wherein only sidewalls of the at least one opening of the connecting device and the at least one opening of the receiving surface create sidewalls of the channel when aligned.

12. The method according to claim 11 wherein the step of exerting a force between the contact plane of the connecting device and the receiving planar surface of the receiving member is selected from:
exerting by a force of any of mechanical-, magnetic-, gravitational-, electromagnetic-, electrostatic-, adhesive or of pressure differential nature, or any combination of any number of the seven, and exerting a force between the contact plane of the connecting device and the receiving planar surface of the receiving member, is provided externally, and exerting a force between the contact plane of the connecting device and the receiving planar surface of the receiving member is performed by means attached to the pin, and exerting a force between the contact plane of the connecting device and the receiving planar surface of the receiving member is performed by means attached to the connecting device or attached to the receiving member.

13. The method according to claim 12 wherein the step of exerting a force between the contact plane and the receiving planar surface of the receiving member clamps the connecting device to the receiving member.

14. The method according to claim 11, further comprising notching the walls of at least one opening of the main body of the connecting device.

15. A method for joining a system comprising a pin, a receiving member and an auxiliary device according to claim 1, comprising the steps of preparing the system, without glue applied,
   aligning the system,
   adding glue to the system, and
   post-treating the system.

16. The method according to claim 15 wherein preparing the system comprises the step of adding means for providing a force to the connecting device in order to keep the connecting device in parallel or in contact with the receiving member.

17. The method according to claim 15 wherein aligning the system comprises the steps of
   exerting a force to keep the receiving member and the auxiliary device in parallel or in contact with each other, while moving the pin and the receiving member relative to each other in up to six degrees of freedom.

18. The method according to claim 15 wherein the step of post treatment is selected from the step of performing alignment before curing the glue and the post treatment comprises the step of removing the means for providing a force.

19. An optical engine comprising a system according to claim 1.

20. A connecting and aligning system, the system comprising:
   a pin and a receiving member having a receiving planar surface with at least one opening being big enough to provide space between the pin and the receiving member to allow freedom of movement for an alignment process, and
   a connecting device having a main body with a contact plane, said main body having two major surfaces lying in the contact plane and at least one opening whereby the connecting device is placed with the contact plane towards the receiving planar surface so that the at least one opening of the connecting device overlaps the at least one opening of the receiving surface, to create a channel, and the pin is inserted into said channel in a direction orthogonal to the at least one major surface,
   said system further comprising at least one member, said at least one member and two major surfaces configured in a way such that a force is exerted between the two major surfaces lying in the contact plane of the connecting device and the receiving planar surface of the receiving member,
   wherein the orientation of the pin with respect to the receiving planar surface of the receiving member can vary with six degrees of freedom in the alignment process and the connecting device is configured to slide over the receiving member in a lateral movement, and for all orientations, the two major surfaces lying in the contact plane of the connecting device and the receiving planar surface of the receiving member remain parallel to each other,
   wherein orientation of the pin varying with six degrees of freedom in the alignment process includes a center axis of the pin being able to be shifted laterally in the at least one opening with respect to a center axis of the channel to create an offset, and wherein the pin and receiving member are configured in a way to be able to be fixed with the offset between the center axis of the pin and the center axis of the channel after the alignment process,
   wherein only sidewalls of the at least one opening of the connecting device and the at least one opening of the receiving surface create sidewalls of the channel when aligned.

* * * * *